United States Patent
Besier

(10) Patent No.: US 6,857,426 B2
(45) Date of Patent: Feb. 22, 2005

(54) ABSORBER ELEMENT FOR SOLAR HIGH-TEMPERATURE HEAT GENERATION, AND A METHOD FOR ITS PRODUCTION

(76) Inventor: Dirk Besier, Schiefersteinstrasse 20, 65199 Wiesbaden (DE)

(*) Notice: Subject to any disclaimer, the term of this patent is extended or adjusted under 35 U.S.C. 154(b) by 27 days.

(21) Appl. No.: 10/669,409

(22) Filed: Sep. 25, 2003

(65) Prior Publication Data

US 2004/0055593 A1 Mar. 25, 2004

(30) Foreign Application Priority Data

Sep. 25, 2002 (DE) .................................. 202 14 823 U

(51) Int. Cl.[7] .................................................. F24J 2/18
(52) U.S. Cl. ........................ 126/685; 126/686; 126/657; 126/600
(58) Field of Search ................................ 126/600, 601, 126/605, 648, 649, 651, 657, 680, 699, 683, 684, 685, 686, 687, 692, 698, 704; 359/850, 852, 853, 861, 864, 838

(56) References Cited

U.S. PATENT DOCUMENTS

| | | | |
|---|---|---|---|
| 4,069,812 A | | 1/1978 | O'Neill |
| 4,238,246 A | | 12/1980 | Genequand et al. |
| 4,377,154 A | * | 3/1983 | Meckler ...................... 126/603 |
| 4,479,485 A | * | 10/1984 | McDougal et al. ......... 126/648 |
| 4,841,946 A | * | 6/1989 | Marks .......................... 126/618 |
| 5,365,920 A | * | 11/1994 | Lechner ...................... 126/696 |
| 5,529,054 A | * | 6/1996 | Shoen ......................... 126/681 |
| 5,574,317 A | * | 11/1996 | Jonsson et al. ................ 307/95 |
| 6,415,783 B1 | * | 7/2002 | Harrison ..................... 126/683 |

FOREIGN PATENT DOCUMENTS

| | | |
|---|---|---|
| DE | 27 57 155 A1 | 6/1978 |
| DE | 30 20 310 A1 | 12/1980 |
| FR | 555420 | 6/1923 |

* cited by examiner

Primary Examiner—James C. Yeung
(74) Attorney, Agent, or Firm—Barnes & Thornburg LLP

(57) ABSTRACT

The present disclosure relates to an absorber element for solar high-temperature heat generation. The absorber element includes a light focusing unit, an outer tube composed of a translucent material and an absorber which is arranged in the absorber element. The absorber is surrounded by at least one reflector channel having an opening gap. A focal line of the light focusing unit lies on a center axis of the outer tube and the absorber does not lie on the center axis of the outer tube. The opening gap of the at least one reflector channel, through which the solar rays fall on the absorber, lies on the center axis of the outer tube, and hence on the focal line.

13 Claims, 3 Drawing Sheets

ABSORBER ELEMENT FOR SOLAR HIGH-TEMPERATURE HEAT GENERATION, AND A METHOD FOR ITS PRODUCTION

CROSS-REFERENCE

This application claims priority to German Application 202 14 823.8 filed Sep. 25, 2002, which disclosure is hereby incorporated herein by reference.

BACKGROUND

The present disclosure relates to an absorber element for solar high-temperature heat generation, the absorber element having a light focusing element unit and an outer tube composed of a translucent material, and an absorber which is arranged in the outer tube and to which the solar rays are passed by the light focusing element. The present disclosure also relates to a method for producing the absorber element.

Absorber elements are generally known. In solar-thermal power stations, the radiation energy from the sun is concentrated by mirror systems, preferably with readjustment, and is used for heating a heat carrier medium. In one generally known design, the heat carrier medium flows through long absorber tubes, which are arranged at the focus of parabolic groove collectors.

Instead of using reflecting systems, the radiation energy can also be concentrated by using refracting systems (convergent lenses). One example of a linearly optically concentrating system such as this is disclosed in U.S. Pat. No. 4,287,881, dated 8 Sep. 1981.

Solar collectors, in which the actual absorber is surrounded by elements which reflect the radiation back to it, are disclosed, for example, in French Patent 555 420, U.S. Pat. Nos. 4,300,538, 4,440,155, 4,512,335 and German Patents 27 57 155 and 30 20 310.

One problem with solar high-temperature heat generation is the heat losses that result from radiation emitted by the absorber tube. Owing to the high temperature, these heat losses are considerable. In order to reduce the heat losses, it is generally known for the actual absorber tube to be arranged in an outer tube. Although this reduces the heat losses, they are, however, still sufficiently high that the efficiency of solar high-temperature heat generation remains well below the theoretically achievable level.

SUMMARY

An aspect of the present disclosure is thus to provide an absorber element for solar high-temperature heat generation, in which the heat losses are minimal. A further aspect is to provide a simple method for producing an absorber element such as this.

Solar high-temperature heat generation may be accomplished by an absorber element having a light focusing unit, an outer tube composed of a translucent material and an absorber which is arranged in the outer tube and to which solar rays are passed by the light focusing element. The absorber is surrounded by at least one reflector channel whose surface has a low emission and absorption capability, and which reflects heat radiation which originates from the absorber back to the absorber. A focal line of the light focusing unit lies on a center axis of the outer tube, and the absorber does not lie on the center axis of the outer tube. An opening gap in the at least one reflector channel lies on the center axis of the outer tube and the solar rays fall on the absorber through this opening gap. The absorber includes an absorber tube, through which a heat carrier medium circulates, and absorber plates which are mounted on the absorber tube. The absorber plates are curved such that they essentially completely absorb the solar rays which are incident on them through the opening gap.

Additional refinements may include an inner face of the at least one reflector channel, which points towards the absorber and is formed from a small number of essentially planar surfaces. The at least one reflector channel may include an outer reflector channel surrounding and coaxial with respect to an inner reflector channel. The outer and reflecting channels may include inner faces pointing towards the absorber and both channels being formed from a small number of essentially planar surfaces. The inner and the outer reflector channels may be jointly readjusted to track sunlight. The inner and the outer reflector channels may be readjusted by magnets which are mounted on a holding structure outside the outer tube. The absorber, together with the absorber tube and the absorber plates, may be firmly mounted, and may not be readjusted. The light focusing unit may include at least one sheet deflection mirror and at least one parabolic groove. The light focusing unit may have at least one linear convergent lens. The outer tube may be composed of glass. The heat carrier medium may be water. Steam may be generated in the absorber element and supplied to a process machine for electricity generation. The process machine may be a reciprocating piston motor with stepped pistons.

One method of producing an absorber element of the above type includes the steps of: assembling the absorber element, but the at least one reflector channel not having the opening gap; and, injecting parallel laser light via the light focusing unit, thereby burning the opening gap out of a wall of the at least one reflector channel.

As mentioned above, the reflector channel which, according to the present disclosure, is arranged around the absorber, reflects the long-wave thermal radiation, which is radiated from the absorber, back to it, and thus minimizes the radiation heat losses.

At least on the inner face which points towards the absorber, the reflector channel is preferably formed from a small number of essentially planar surfaces. The majority of the thermal radiation which the absorber emits over an angle range of 180° is largely reflected directly back to the absorber from the straight reflector channel walls, and is not lost by multiple reflection on curved reflector channel walls.

The opening gap or slit in the reflector channel runs on the focal line of the light focusing unit. The focal line lies on the center axis of the outer tube. Since the solar rays are focused by the light focusing unit onto the center axis of the outer tube, they strike the outer tube at right angles and are not refracted by it. The absorber, with its absorber tube and curved absorber plates, can thus be stationary and firmly mounted. The solar rays, which diverge after the center axis, completely strike an absorber channel, which is formed by the absorber tube and the absorber plates. No sunlight therefore strikes the wall of the reflector channel, which is optimized to reflect heat rays from the absorber.

The solar rays thus effectively heat the heat carrier medium in the absorber tube, for example, in order to produce steam. The compact shape of the absorber element allows high-temperature steam to be produced with low losses in small units. Even in regions in which the sunlight is relatively weak, the use of small units for high-temperature heat generation is thus technically and financially of interest. The steam can be used with high efficiency in a circulating process for electricity generation. Solar generation can thus be used at a high temperature for heating purposes, even in winter.

The production method according to the present disclosure allows a minimum opening gap to be produced in the reflector channel, while compensating for the manufacturing and assembly tolerances of the light focusing unit. This results in a gap geometry which is optimally matched to the respective structure. The manufacturing complexity for the light focusing unit and for the absorber unit is reduced, and the thermal losses during operation are minimized.

Other aspects of the present disclosure will become apparent from the following descriptions when considered in conjunction with the accompanying drawings.

DETAILED DESCRIPTION OF THE DRAWINGS

Figure 1:
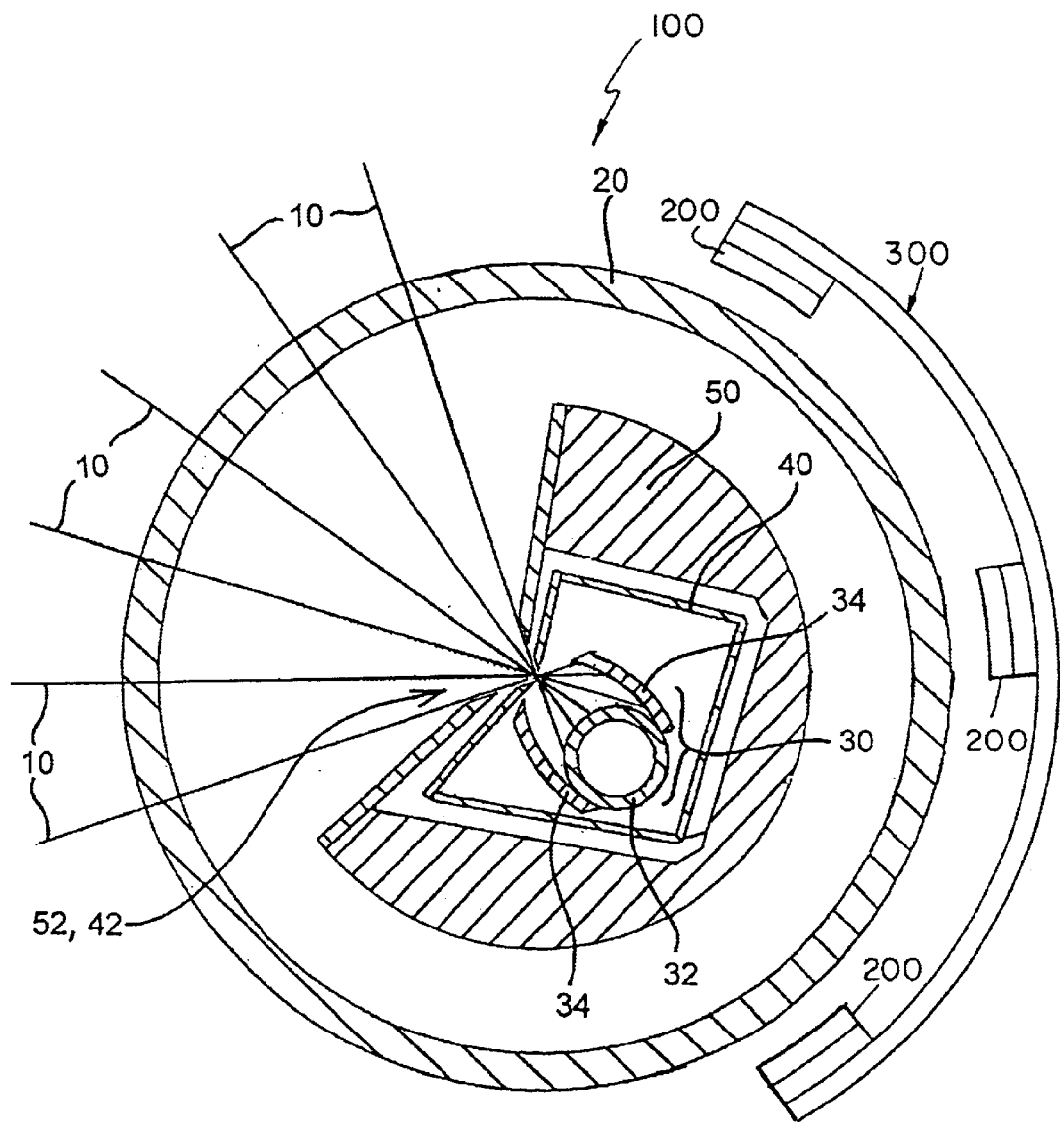
FIG. 1 shows a cross section view through an absorber element, according to the present disclosure.
Figure 2:
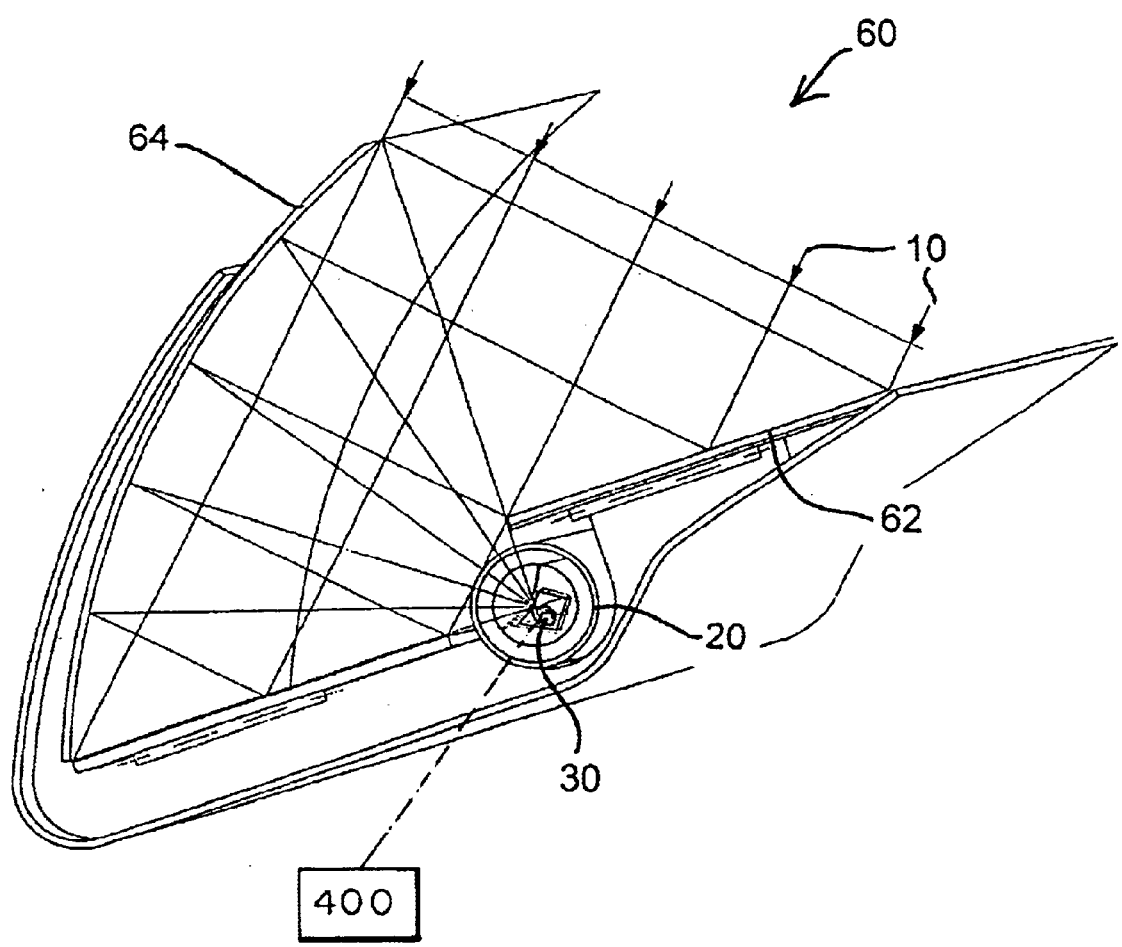
FIG. 2 shows the absorber element of FIG. 1, in an arrangement with groove reflectors.

FIG. 1 shows a cross section through an absorber element 100 for solar high-temperature heat generation. Solar rays 10 coming from the sun are focused by a linear light focusing unit 60 (which is shown in FIG. 2) onto center line of an outer tube 20. The center line or axis of the outer tube 20 coincides with a focal line of the linear light focusing unit 60. The outer tube 20 is preferably composed of glass. In general, the outer tube 20 is composed of a translucent material, through which short-wave radiation passes well but long-wave thermal radiation does not pass well. These requirements are satisfied by glass.

There is a vacuum in the interior of an outer tube 20. The solar rays 10, which diverge again behind the focal line, strike the absorber 30 there, which absorber 30 is arranged eccentrically with respect to the center axis of the outer tube 20. The absorber 30 has a high absorption capability on an irradiated face, and has a low emission capability on an opposite face, in order to absorb a large amount of solar radiation and to emit little thermal radiation.

The absorber 30 is fixed in the outer tube 20. The absorber 30 comprises an absorber tube 32, in which a heat carrier medium circulates, and absorber sheets or absorber plates 34 which are fitted to the absorber tube 32. The absorber sheets or absorber plates 34 are preferably welded to the absorber tube 32, in order to ensure good heat transmission from the absorber plates 34 to the absorber tube 32. The absorber plates 34 are curved on at least one surface such that the incident solar rays 10 are virtually completely received and absorbed. A high degree of absorption is achieved by multiple reflection and absorption processes for obliquely incident solar rays 10 along the curved surface on an inner face of the absorber plates 34.

The absorber 30 is surrounded by a reflector channel 40, which reflects the thermal radiation coming from the absorber 30 back to it. A surface of the reflector channel 40 has a low emission and absorption capability. The reflector channel 40 has an opening gap 42, through which the solar rays 10 enter the channel 40, on the focal line. Since the focal line runs or lies in the opening gap 42, the opening gap 42 may be narrow. The heat losses through the opening gap 42 are thus small. Apart from the opening gap 42, the reflector channel 40 is closed all the way round.

On an inner face pointing towards the absorber 30, the reflector channel 40 is formed from a small number of essentially planar surfaces, in order to ensure that the thermal radiation originating from the absorber 30 is reflected back as directly as possible. In cross section, as can be seen in FIG. 1, the reflector channel 40 thus represents a rectangular or trapezoidal structure. A face of the reflector channel 40 into which the focal line runs can be bent slightly inwards towards the absorber 30 in order to achieve an optimum radiation profile on precisely this focal line, into the opening gap 42.

On its inner face with this bend, the reflector channel 40 thus has five essentially planar surfaces or walls, and without such bend it has four such surfaces.

The reflector channel 40 is preferably coaxially surrounded by a further, outer reflector channel 50, which has the same surface characteristics as the inner reflector channel 40 and is connected in an interlocking manner to it at a small number of points by poorly thermally conductive elements, composed, for example, of ceramic. The outer reflector channel 50, on a face upon which light strikes, has an opening gap 52 which runs parallel to the opening gap 42 in the inner reflector channel 40 and is somewhat broader than it, in order to avoid blocking the solar rays 10.

The statements which have been made with regard to the inner reflector channel 40 apply equally to an interior of the outer reflector channel 50. That is to say the inner face of the outer reflector channel 50, which points towards the absorber 30, as well, is formed by a small number of essentially planar surfaces. However, the outer reflector channel 50 is circular on its outside, and can be rotated together with the inner reflector channel 40 about a center axis of the outer tube 20. The reflector channels 40, 50 are positioned in rotation via magnets 200 (see FIG. 1) (shown, for example as three magnets), which are arranged outside the outer tube 20, in order to match their position to the incidence of the light, depending on the time of day. The magnets are mounted on a holding structure 300 (see FIG. 1), which is arranged such that it can rotate about the center axis of the outer tube 20. The light focusing unit 60 is also mounted (not shown) on the holding structure 300. The holding structure 300 is positioned in rotation by an electric motor or motors (not shown). An optoelectronic sensor (not shown), which is rotated together with the holding structure 300, controls rotational positioning for readjustment to match the light incidence direction.

The reflector channels 40, 50 have the function of reflecting long-wave thermal radiation which is emitted from the absorber 30 back to it, and thus of minimizing the heat losses caused by radiation. Electrochemically plated metal surfaces are able to reflect the majority of long-wave radiation. The absorber tube 32, together with the absorber plates 34 which are mounted on it, is arranged firmly in the outer tube 20 and is not involved in positioning movements of the reflector channels 40, 50. The absorber plates 34 absorb the short-wave solar radiation and prevent the solar radiation from striking the inner reflector channel 40 directly, and being absorbed there.

FIG. 2 shows an arrangement of the outer tube 20 with the absorber 30 on a light focusing unit 60 with sheet deflection mirrors 62 and a parabolic groove mirror 64. The mirrors 62, 64 are mounted (not shown) on the holding structure 300 such that they can rotate about the center axis of the outer tube 20. The sheet deflection mirrors 62 are arranged in a longitudinal direction of the outer tube 20, and are rotatably mounted at an angle of 90° with respect to the outer tube 20. The mirrors 62 deflect obliquely incident rays 10 such that the rays 10 are always incident at right angles to an incidence plane of the parabolic groove mirror 64. In consequence, the rays 10 always enter the outer tube 20 through its wall at right angles, without any major reflection losses. The sheet deflection mirrors 62 are positioned in rotation by an electric motor or motors (not shown), and their positions are controlled as a function of the time of day.

Figure 3:
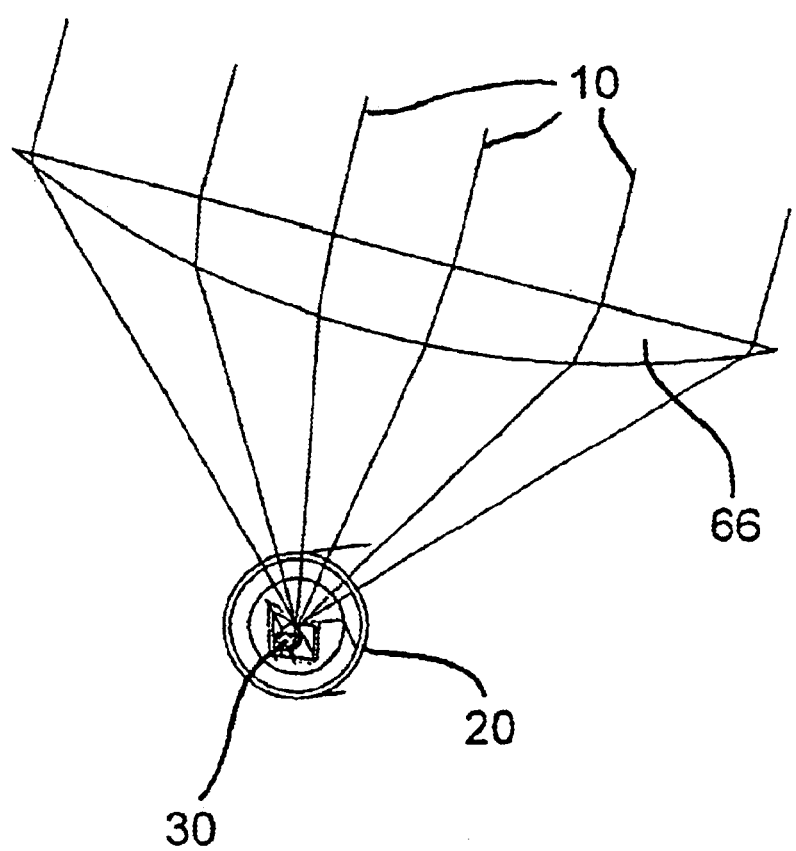
FIG. 3 shows the absorber element of FIG. 1, in an arrangement with convergent lenses.

FIG. 3 shows an alternative arrangement of the outer tube 20 with the absorber 30 on a light focusing unit with a linear convergent lens 66. The convergent lens 66 is mounted (not shown) on a holding structure 300 such that it can rotate with respect to the center axis of the outer tube 20. The focal line of the convergent lens 66 lies on the center axis of the outer tube 20.

In the described absorber element 100, the opening gap 42, 52 of the reflector channel 40 or of the reflector channels 40, 50 lies on the focal line of the light focusing unit 60, and on the center axis of the outer tube 20. Since the solar rays 10 are always focused on the center axis of the outer tube 20 by the light focusing unit 60, which is readjusted to match the sun, they pass through the outer tube 20 at right angles, and are not refracted there. The absorber tube 32 and the absorber plates 34 which are thermally connected to it form an absorber channel, which is mounted firmly. The solar rays 10, which diverge once again after the center axis, all enter this absorber channel. The reflector channel 40 or the reflector channels 40, 50 is or are readjusted by external magnetic forces, for example, with the outer tube 20 being stationary.

The described embodiments can be used for solar high-pressure direct vaporization for electricity generation in small power stations.

Water is used as a heat carrier medium for this purpose. The water is heated in the absorber tube 32 of absorber element 100 which is used as a feed water heater. The water is vaporized and superheated in two or more downstream elements 100, in order to produce superheated high-pressure steam. The elements 100 are arranged geographically offset with respect to one another, so that the superheated steam enters upper elements 100. Two or more elements 100 are combined to form a module (not shown). The elements 100, which can rotate, are accommodated in the holding structure (not shown) for the module. The absorber tubes 32 of all the elements 100 are of the same length. However, since the vaporization process requires more thermal power than that required to heat the feed water, two absorber elements 100 connected in parallel are used as evaporators, and some of the heated feed water is supplied to each of them via a distributor (not shown). In a simple case, the distributor may have a throttle valve (not shown) in each feed line (not shown) of the two absorber elements 100 which form the evaporator, in order to supply the same amount of feed water to both. If these two absorber elements 100 are fitted at different geodetic heights, the distributor may also have an overflow container (not shown) for the heated feed water. The overflow container contains two overflows which are separate but are located at the same height and above the two absorber tubes 32 of the evaporator, and from which the feed water flows away in a corresponding manner to the two absorber tubes 32. Both absorber tubes 32 thus receive the same amount of feed water, despite being at different geodetic heights. The steam from two or more modules is carried in a closed circuit, and is expanded in a process machine 400 (see FIG. 2) in order to generate electricity. The expanded steam is liquefied, with heat being emitted to the environment, and is fed back to the modules via a feed water pump (not shown).

In low-power systems, a reciprocating piston motor (not shown) with stepped pistons can be used as the process machine 400. A multistage reciprocating piston motor can adapt itself well to changing load requirements. For higher power levels, steam turbines may be used, although they do not react as quickly to load changes owing to the changing energy supply.

The above-described absorber element 100 can be produced by assembling the absorber element 100 completely, but with at least the surfaces or walls of the inner reflector channel 40 still not having an opening gap 42. Parallel laser light is then injected via the light focusing unit 60 and, focused in this way, burns out the opening gap 42 from the wall of the reflector channel 40. This method results in an opening gap 42 which takes account of the manufacturing and assembly tolerances of the light focusing unit 60 with reduced manufacturing effort. The minimal size of the opening gap 42 minimizes the thermal losses.

The opening gap 52 in a wall or surface of the outer reflector channel 50 can also be produced in the same way.

Although the present disclosure has been described and illustrated in detail, it is to be clearly understood that this is done by way of illustration and example only and is not to be taken by way of limitation. The spirit and scone of the present disclosure are to be limited only by the terms of the appended claims.

I claim:

1. An absorber element for solar high-temperature heat generation, having a light focusing unit, an outer tube composed of a translucent material and an absorber which is arranged in the outer tube and to which solar rays are passed by the light focusing unit, wherein the absorber is surrounded by at least one reflector channel, whose surface has a low emission and absorption capability, and which reflects heat radiation which originates from the absorber back to the absorber;

a focal line of the light focusing unit lies on a center axis of the outer tube, and the absorber does not lie on the center axis of the outer tube;

an opening gap in the at least one reflector channel lies on the center axis of the outer tube and the solar rays fall on the absorber through this opening gap; and the absorber includes an absorber tube, through which a heat carrier medium circulates, and absorber plates which are mounted on the absorber tube, and with the absorber plates being curved such that they essentially completely absorb the solar rays which are incident on them through the opening gap.

2. The absorber element according to claim 1, wherein an inner face of the at least one reflector channel, which points towards the absorber, is formed from a small number of essentially planar surfaces.

3. The absorber element according to claim 1, wherein the at least one reflector channel includes an outer reflector channel surrounding an inner reflector channel and is coaxial with respect to the inner reflector channel, and the outer reflecting channel includes an inner face pointing towards the absorber and formed from a small number of essentially planar surfaces.

4. The absorber element according to claim 3, wherein the inner and the outer reflector channels are jointly readjusted to track sunlight.

5. The absorber element according to claim 4, wherein the inner and the outer reflector channels are readjusted by magnets which are mounted on a holding structure outside the outer tube.

6. The absorber element according to claim 1, wherein the absorber, together with the absorber tube and the absorber plates is firmly mounted, and is not readjusted.

7. The absorber element according to claim 1, wherein the light focusing unit includes at least one sheet deflection mirror and at least one parabolic groove mirror.

8. The absorber element according to claim 1, wherein the light focusing unit has at least one linear convergent lens.

9. The absorber element according to claim 1, wherein the outer tube is composed of glass.

10. The absorber element according to claim 1, wherein the heat carrier medium is water.

11. The absorber element according to claim 1, wherein steam is generated in the absorber element and is supplied to a process machine for electricity generation.

12. The absorber element according to claim 11, wherein the process machine is a reciprocating piston motor with stepped pistons.

13. A method for producing an absorber element according to claim 1, the method steps comprising:

assembling the absorber element, but the at least one reflector channel not having the opening gap; and injecting parallel laser light via the light focusing unit, thereby burning the opening gap out of a wall of the at least one reflector channel.

\* \* \* \* \*